US012695018B2

United States Patent
Wakabayashi

(12) United States Patent
(10) Patent No.: US 12,695,018 B2
(45) Date of Patent: Jul. 28, 2026

(54) COIL COMPONENT, CIRCUIT BOARD ARRANGEMENT, ELECTRONIC DEVICE, AND METHOD OF MANUFACTURING COIL COMPONENT

(71) Applicant: TAIYO YUDEN CO., LTD., Tokyo (JP)

(72) Inventor: Hirotaka Wakabayashi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 781 days.

(21) Appl. No.: 18/064,182

(22) Filed: Dec. 9, 2022

(65) Prior Publication Data

US 2023/0197328 A1 Jun. 22, 2023

(30) Foreign Application Priority Data

Dec. 22, 2021 (JP) ................................ 2021-207881

(51) Int. Cl.
*H01F 27/06* (2006.01)
*H01F 27/29* (2006.01)
*H01F 41/04* (2006.01)

(52) U.S. Cl.
CPC ........... *H01F 27/06* (2013.01); *H01F 27/292* (2013.01); *H01F 41/04* (2013.01); *H01F 2027/065* (2013.01)

(58) Field of Classification Search
CPC ........ H01F 27/06; H01F 27/292; H01F 41/04; H01F 2027/065
See application file for complete search history.

(56) References Cited

U.S. PATENT DOCUMENTS

2009/0323253 A1* 12/2009 Kobayashi ............. H01G 4/005 427/79
2016/0099106 A1 4/2016 Kurokawa et al.
(Continued)

FOREIGN PATENT DOCUMENTS

JP 2008300769 A * 12/2008
JP 2015053495 A 3/2015
(Continued)

OTHER PUBLICATIONS

A Notice of Reasons for Refusal issued by the Japanese Patent Office, mailed Mar. 31, 2026, for Japanese counterpart application No. 2021-207881. (3 pages).
(Continued)

*Primary Examiner* — Malcolm Barnes
(74) *Attorney, Agent, or Firm* — Law Office of Katsuhiro Arai

(57) ABSTRACT

A coil component includes an element body, a conductor, and at least one outer electrode. The element body has a first face and a second face. The first face is adjacent or continuous to the second face. The conductor is provided inside and/or on a surface of the element body. The outer electrode is electrically connected to the conductor. The outer electrode includes a first base electrode layer, a second base electrode layer, and a metal layer. The first base electrode layer is formed on the first face of the element body. The second base electrode layer is formed on the second face of the element body and at least partly spaced apart from the first base electrode layer. The metal layer continuously covers the first base electrode layer and the second base electrode layer.

13 Claims, 16 Drawing Sheets

(56) References Cited

U.S. PATENT DOCUMENTS

| | | | | |
|---|---|---|---|---|
| 2017/0186549 | A1 | 6/2017 | Kurokawa et al. | |
| 2017/0186550 | A1 | 6/2017 | Kurokawa et al. | |
| 2017/0263382 | A1 | 9/2017 | Kurokawa et al. | |
| 2017/0287644 | A1 | 10/2017 | Kurokawa et al. | |
| 2017/0365399 | A1* | 12/2017 | Kobayashi | H01F 27/292 |
| 2017/0365413 | A1 | 12/2017 | Kurokawa et al. | |
| 2018/0090276 | A1* | 3/2018 | Ito | H01G 4/248 |
| 2018/0247754 | A1 | 8/2018 | Tanaka et al. | |
| 2020/0203074 | A1* | 6/2020 | Ono | H01G 2/08 |
| 2020/0312562 | A1* | 10/2020 | Nishibayashi | H01G 4/2325 |
| 2023/0103865 | A1* | 4/2023 | Maki | H01F 27/323<br>336/192 |

FOREIGN PATENT DOCUMENTS

| | | | |
|---|---|---|---|
| JP | 2018142671 | A | 9/2018 |
| JP | 2019186394 | A | 10/2019 |
| JP | 2020102479 | A | 7/2020 |
| JP | 2021190546 | A | * 12/2021 |

OTHER PUBLICATIONS

A Notice of Reasons for Refusal issued by the Japanese Patent Office, mailed Nov. 4, 2025, for Japanese counterpart application No. 2021-207881. (4 pages).

* cited by examiner

COIL COMPONENT, CIRCUIT BOARD ARRANGEMENT, ELECTRONIC DEVICE, AND METHOD OF MANUFACTURING COIL COMPONENT

FIELD OF THE INVENTION

The present invention relates to coil components, circuit board arrangements, electronic devices, and methods of manufacturing the coil components.

DESCRIPTION OF THE RELATED ART

As electronic devices, such as communication devices and on-vehicle electrical equipment, become sophisticated, a demand for downsizing and enhanced performance of the electronic devices is growing. Electronic components are used for a wider variety of applications, and such an increase in applications requires improvements of function and quality. In particular, demand concerning environments where electronic components are used is becoming more severe, and there is an increasing need for electronic components that can withstand severe temperatures and severe humidity.

Experiments and studies are conducted to achieve the downsizing of electronic components and to find solutions that make electronic components withstand various environments. In many cases, materials used to make electronic components are revisited, or a change in combinations of such materials is contemplated. In other words, if an electronic component has a weak portion, replacing the material for that portion with a stronger material is considered. As for a portion in which two materials are combined, bringing the properties of these two materials closer is considered. However, in a case where completely different materials are to be combined, bringing the properties of these two materials closer is difficult.

For example, if a multilayer stack in an electronic component has vastly different properties from outer electrodes of the electronic component, stress is produced between the two materials during the manufacturing process or during use. In this respect, JP2015-053495A discloses a technique that adjusts the dimensions of a multilayer stack and of the outer electrodes to reduce residual stress.

In many electronic components, outer electrodes are often made of two or more materials. As a result, stress is produced in the outer electrodes. Similarly, a coil component is often made of two or more materials. Specifically, many coil components include an element body, base electrode layers that are used to connect the outer electrodes to a surface of the element body, and plating layers that are used to mount the outer electrodes on a substrate. If the outer electrode has a structure in which different layers are stacked in sequence, stress is produced within the outer electrode because of, for example, the difference in the properties of the stacked layers. This stress tends to be greater as more metals are used to form the layers, and the greater the difference in the density of the metal layers, the more easily stress is produced between the metal layers.

A coil component is expected to have thicker and higher-density metal layers in order to not only increase the stability or mechanical strength that the coil component has when mounted on the substrate but also keep the resistance of the outer electrodes low. Increasing the density of metal layers (outer electrode) in this manner leads to a further increase in the stress within each of the outer electrodes.

For example, JP2018-142671A proposes a technique for suppressing a decrease in adhering strength between a coil component and a substrate despite a decrease in the area of an outer electrode associated with the size reduction of a coil component.

SUMMARY OF THE INVENTION

Stress on an outer electrode includes stress from a substrate or solder, which is exerted when a coil component is mounted on the substrate. In the configuration disclosed in JP2018-142671A, since the area of contact between the element body and the outer electrode is small, the connection to the substrate is strong and therefore stress from the solder concentrates at one point in the outer electrode. In other words, tension stress from the substrate is exerted on the end-face electrodes in the form of a force acting in the direction perpendicular to the substrate and concentrates in particular at a portion having a higher height (center portion). Stress from the substrate is also produced in the direction parallel to the substrate because of the difference between the thermal expansion coefficient of the substrate and that of the coil component. Thus, stress in the perpendicular direction and stress in the parallel direction (horizontal direction) compositely result in high stress.

An object of the present invention is to reduce stress concentration in an outer electrode of a coil component.

Additional or separate features and advantages of the invention will be set forth in the descriptions that follow and in part will be apparent from the description, or may be learned by practice of the invention. The objectives and other advantages of the invention will be realized and attained by the structures particularly pointed out in the written description and claims thereof as well as the drawings appended thereto.

To achieve these and other advantages and in accordance with the purpose of the present invention, as embodied and broadly described, in one aspect, the present disclosure provides a coil component that includes an element body, a conductor, and at least one outer electrode. The element body has a first face and a second face. The second face is adjacent or continuous to the first face and is not coplanar to the first face. The conductor is provided inside and/or on a surface of the element body. The outer electrode is electrically connected to the conductor. The outer electrode includes a first base electrode layer, a second base electrode layer, and a metal layer. The first base electrode layer is provided on the first face of the element body. The second base electrode layer is provided on the second face and at least partly spaced apart from the first base electrode layer. The metal layer continuously covers the first base electrode layer and the second base electrode layer.

The outer electrode may include a plurality of third base electrode layers provided between the first base electrode layer and the second base electrode layer. The third base electrode layers may be at least partly spaced apart from the first base electrode layer and the second base electrode layer.

The second face of the element body may be a bottom face of the element body. The bottom face of the element body may face a substrate (board) when the coil component is mounted on the substrate. The first face of the element body may be an end face (left face, right face) of the element body. A length of the metal layer in its extending direction from the bottom face to the end face may be shorter on the end face than on the bottom face.

The metal layer may have a higher metal packing fraction than the base electrode layers.

The metal layer may include a nickel layer continuously covering the first base electrode layer and the second base electrode layer, and a tin layer covering the nickel layer. The tin layer may be thinner than the nickel layer.

The outer electrode may include a conductive resin layer provided between the metal layer and at least one of the first and second base electrode layers.

According to another aspect of the present invention, there is provided a circuit board arrangement that includes the above-described coil component, and a substrate or board on which the coil component is mounted by solder bonding with the outer electrode disposed between the coil component and the substrate.

According to still another aspect of the present invention, there is provided an electronic device that includes the above-described circuit board arrangement.

According to yet another aspect of the present invention, there is provided a method of manufacturing the above-described coil component. The method includes forming a rugged shape (recesses and projections) at a portion bordering the first face and the second face of the element body. The method also includes applying a material for a base electrode layer over the first face and the second face of the element body in which the rugged shape has been formed. The method also includes forming the first base electrode layer and the second base electrode layer that are at least partly spaced apart from each other when applying the material for a base electrode layer or after applying the material.

According to another aspect of the present invention, there is provided a method of manufacturing the above-described coil component. The method includes applying a material for a base electrode layer over the first face and the second face of the element body. The method also includes forming the first base electrode layer and the second base electrode layer that are at least partly spaced apart from each other. Forming the first and second base electrode layers includes reducing the material applied at a portion bordering the first face and the second face of the element body.

The present invention can reduce stress in the outer electrode of the coil component.

DETAILED DESCRIPTION OF EMBODIMENTS

Figure 1:
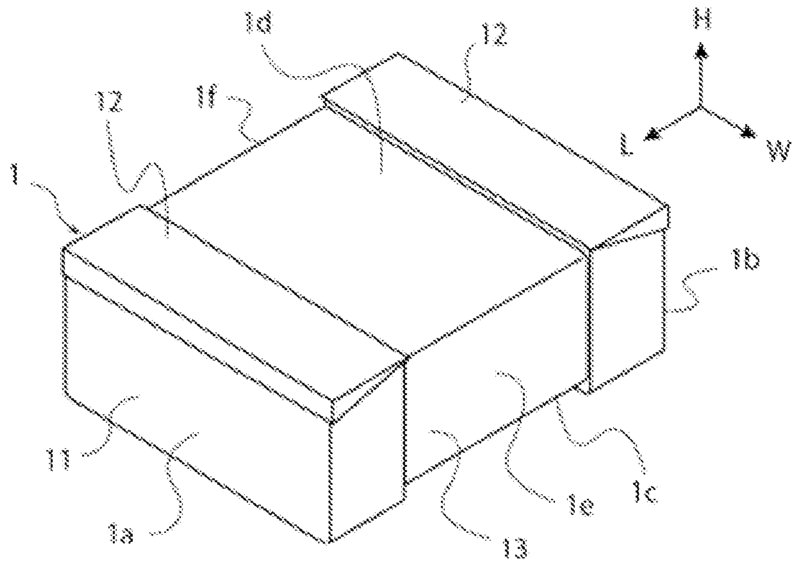
FIG. 1 is a perspective view illustrating a coil component according to one embodiment of the present invention.

Hereinafter, embodiments of the present invention will be described in detail with reference to the appended drawings. The following embodiments do not limit the present invention, and not all the combinations of the features described in the embodiments are necessarily essential for the configuration of the present invention. The configuration of the embodiments can be modified or changed, as appropriate, in accordance with the specifications and/or various conditions (use conditions, use environments, etc.) of devices to which the present invention is applied.

The technical scope of the present invention is defined by the claims and is not limited by any individual embodiment described below. To facilitate an understanding of each configuration, the structures shown in the drawings referred to in the following description may differ from the actual structures in terms of their scales, shapes, and so on. Any constituent element shown in one of the drawings may be referred to in the description of other drawings.

Appearance of a Coil Component

FIG. 1 is a perspective view illustrating a coil component 1 according to one embodiment of the present invention.

A coil component 1 may be an inductor, a transformer, a filter, a reactor, or any of various other coil components. Alternatively, the coil component 1 may be a coupled inductor, a choke coil, or any of various other magnetic coupling coil components. Alternatively, the coil component 1 may be, for example, an inductor used in a DC/DC converter. The applications of the coil component 1 are not limited to those explicitly mentioned in this specification.

In the following description, unless understood otherwise from the context, the L-axis direction, the W-axis direction, and the H-axis direction indicated in FIG. 1 are used as reference in the description of directions. The L-axis direction is referred to as the length direction, the W-axis direction is referred to as the width direction, and the H-axis direction is referred to as the height direction. The height direction may also be referred to as the thickness direction.

The coil component 1 has a rectangular parallelepiped outer shape. Specifically, the coil component 1 has a first end face (left face) 1*a* and a second end face (right face) 1*b* at its respective ends in the length direction, a first principal face 1*c* (top face 1*c*) and a second principal face 1*d* (bottom face 1*d*) at its respective ends in the height direction, and a front face 1*e* and a rear face 1*f* at its respective ends in the width direction. The coil component 1 has eight corners and twelve ridges. The twelve ridges connect the eight corners. It should be noted that FIG. 1 shows the coil component 1 depicted in an orientation in which the bottom face 1*d* of the coil component 1 faces upward and the top face 1*c* faces downward.

The first end face 1a, the second end face 1b, the first principal face 1c, the second principal face 1d, the front face 1e, and the rear face 1f of the coil component 1 may each be a flat surface or a curved surface. The eight corners and the twelve edges of the coil component 1 may be round.

In this specification, even in a case where the first end face 1a, the second end face 1b, the first principal face 1c, the second principal face 1d, the front face 1e, and the rear face 1f of the coil component 1 are partly curved or where the corners or the ridges of the coil component 1 are round, the shape of such a coil component 1 may be referred to as a rectangular parallelepiped shape. In other words, the term "rectangular parallelepiped" used in this specification is not to be construed as referring to a rectangular parallelepiped in a strict mathematical sense.

Structure of the Coil Component

The coil component 1 of this embodiment includes a base body (element body) 11, outer electrodes 12, and an armoring portion (exterior portion) 13. The coil component 1 also includes a conductor thereinside. The element body 11 may be called "drum core", in which a conductor 14 (FIG. 3) is wound on the surface of the element body 11. Alternatively, the element body 11 may have a conductor disposed thereinside.

Figure 2:
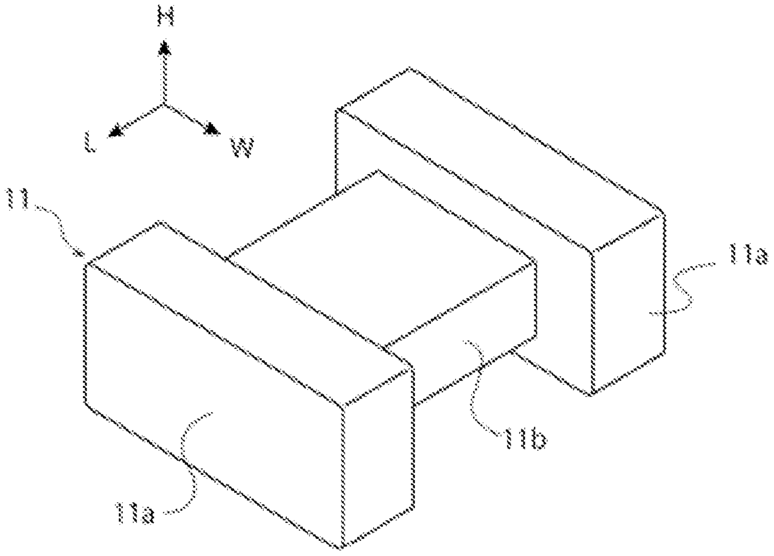
FIG. 2 is a perspective view of an element body of the coil component shown in FIG. 1.
Figure 3:
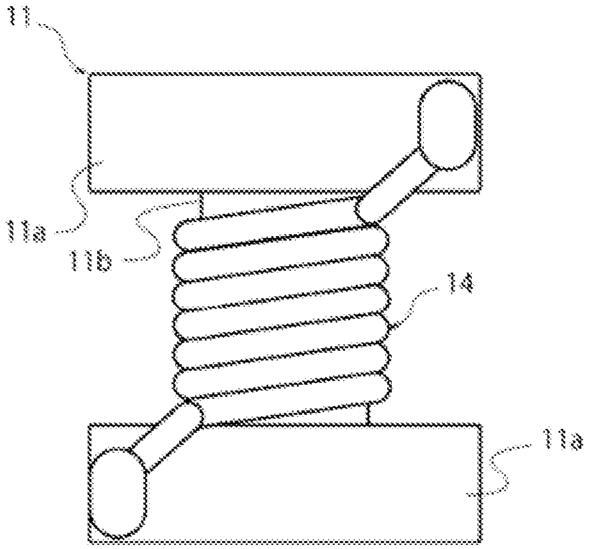
FIG. 3 is a top view of a conductor of the coil component shown in FIG. 1.

FIG. 2 is a perspective view of the element body 11, and FIG. 3 is a top view illustrating the conductor 14. The following description is given with reference to FIGS. 1 to 3.

The element body 11 is made of a magnetic material or a non-magnetic material. Examples of magnetic materials that can be used for the element body 11 include ferrite or a soft magnetic alloy material. Examples of non-magnetic materials that can be used for the element body 11 include alumina or glass. Magnetic materials used for the element body 11 may be various crystalline or amorphous alloy magnetic materials or may be a combination of a crystalline material and an amorphous material.

Crystalline alloy magnetic materials that can be used as magnetic materials for the element body 11 include a crystalline alloy material that, for example, contains, as a main component, no less than 50 wt % Fe (iron) or no less than 85 wt % Fe and contains one or more elements selected from Si (silicon), Al (aluminum), Cr (chromium), Ni (nickel), Ti (titanium), and Zr (zirconium). Amorphous alloy magnetic materials that can be used as magnetic materials for the element body 11 include an amorphous alloy material that contains, for example, any one of Si (silicon), Al (aluminum), Cr (chromium), Ni (nickel), Ti (titanium), and Zr (zirconium) together with B (boron) or C (carbon).

Examples of magnetic materials that can be used for the element body 11 include pure iron composed of Fe (iron) and unavoidable impurities. Another example of magnetic materials that can be used for the element body 11 include a material that is a combination of pure iron composed of Fe (iron) and an unavoidable impurity and various crystalline or amorphous alloy magnetic materials. Materials for the element body 11 are not limited to those expressly indicated in this specification and can be any known materials suitably usable as materials for the element body.

The element body 11 is fabricated, for example, by mixing powder of the above-mentioned magnetic material or the above-mentioned non-magnetic material with a lubricant to obtain a mixed material, loading the mixed material into a cavity of a molding die, press-molding the mixed material to fabricate a green compact, and subjecting the green compact to heat treatment. The element body 11 can also be fabricated by mixing powder of the above-mentioned magnetic material or the above-mentioned non-magnetic material with resin, glass, or an insulating oxide (e.g., Ni—Zn ferrite or silica) to obtain a mixed material, molding the mixed material, and subjecting the resultant body to heat treatment. In the heat treatment, depending on the material used, the material may be thermally cured at a temperature of no higher than 200 degrees C. or sintered at a temperature of no lower than 600 degrees C. or no lower than 1,000 degrees C.

The conductor 14 is made of a metal material that excels in electrical conductivity. Examples of metal materials that can be used for the conductor 14 include one or more metals selected from Cu (copper), Al (aluminum), Ni (nickel), and Ag (silver), or an alloy that contains any of the listed metals. An insulating film may cover a surface of the conductor 14. The conductor 14 is provided on the surface of or inside the element body 11. As illustrated in FIG. 3, a single conductor 14 is provided for the single element body 11. It should be noted, however, that a plurality of conductors 14 may be provided for the single element body 11.

The element body 11 of this embodiment is what is called a drum core and includes two flanges 11a and a core 11b. The core 11b extends between the two flanges 11a.

In the illustrated embodiment, the core 11b is shaped substantially like a quadrangular prism extending in the length direction. It should be noted that other than the illustrated shape, the core 11b can have any desired shape suitable for allowing the conductor 14 to be wound on the core 11b. For example, the core 11b may be shaped like a polyangular prism, such as a triangular prism, a pentagonal prism, or a hexagonal prism, or the core 11b may be shaped like a circular column, an elliptical column, or a truncated circular cone.

The two flanges 11a are provided at the opposite ends of the core 11b extending in the length direction. Each of the flanges 11a extends in a direction perpendicular to the core 11b. In this specification, when the terms "perpendicular," "orthogonal," and "parallel" are used, these terms are not used in their strict mathematical senses. For example, when the flanges 11a extend in a direction perpendicular to the core 11b, the angle formed by each flange 11a and the core 11b may be 90 degrees or substantially 90 degrees. The range in which the angle is said to be substantially 90 degrees may include any angle within a range of from 70 degrees to 110 degrees, from 75 degrees to 105 degrees, from 80 degrees to 100 degrees, or from 85 degrees to 95 degrees. In a similar manner, the terms "parallel" and "orthogonal" and any other terms that are included in this specification and that can be interpreted in their strict mathematical senses can be interpreted in a sense broader than their strict mathematical senses, with the spirit of the present invention, the context, and general technical knowledge taken into consideration.

In this embodiment, the conductor 14 is formed by a wire wound on the outer periphery of the core 11b of the element body 11. The wire has a thickness (diameter) of, for example, no more than 0.2 mm. Alternatively, the wire diameter may be no more than 0.1 mm, or no more than 0.02 mm. The two ends of the wire of the conductor 14 are connected to the outer electrodes 12 on the respective flanges 11a.

The outer electrodes 12 are formed of a metal material that excels in electrical conductivity. Examples of metal materials used for the outer electrodes 12 include Cu (copper), Ag (silver), Ni (nickel), Pd (palladium), or Sn (tin). Each of the outer electrodes 12 is formed into a multilayer structure in which layers having the above-mentioned metal material as a main component or layers partly alloyed are stacked on top of each other. The outer electrodes 12 are formed, for example, by applying a metal material through dipping (immersion). Alternatively, the outer electrodes 12 may be formed by sputtering or vapor deposition.

The armoring portion 13 may be provided in the coil component 1. The armoring portion 13 covers the conductor 14 in such a manner that the armoring portion 13 fits between the two flanges 11*a*. The armoring portion 13 is provided so as not to affect the outer dimensions of the coil component 1. The armoring portion 13 does not need to cover the entire periphery of the conductor 14, i.e., the armoring portion 13 is provided so as to form at least the top face 1*c* of the coil component 1. For example, the armoring portion 13 covers only an area of the conductor 14 which is close to the top face 1*c*. Alternatively, the armoring portion 13 is provided so as to cover about a half of the conductor 14 from the top face 1*c* toward the bottom face 1*d* of the coil component 1. This can ensure or improve handling of the coil component 1 when a vacuum from a suction device is applied to the exterior part 13 to carry the coil component 1 to a desired location during a process of mounting the coil component 1 onto the substrate 2*a*.

The armoring portion 13 is formed, for example, by filling the space between the two flanges 11*a* with resin. The armoring portion 13 is formed of resin or resin containing a filler. Examples of the materials that can be used for the armoring portion 13 include any resin material that is used to coat a wire in a wire-winding-type coil component. As a filler, a magnetic material or a non-magnetic material can be used. The armoring portion 13 is formed by coating and covering the exterior of the conductor 14 with a composite material containing, for example, resin and a filler with use of a dispenser or the like, and curing the resin component.

The armoring portion 13 may be formed of a material other than resin. Examples of materials for the armoring portion 13 other than resin include metal, ceramics, or any other suitable materials. The armoring portion 13 is formed, for example, by disposing, between the two flanges 11*a*, foil, a plate, or a composite member thereof. The foil, the plate and the composite member of the foil and plate may be made of metal, ceramics, or other suitable materials.

Modifications

The structure of the coil component 1 that includes the element body 11 is not limited to the structure illustrated in FIG. 1 to FIG. 3. One modification will be described with reference to FIGS. 4 and 5, and another modification will be described with reference to FIGS. 6 and 7.

Figure 4:
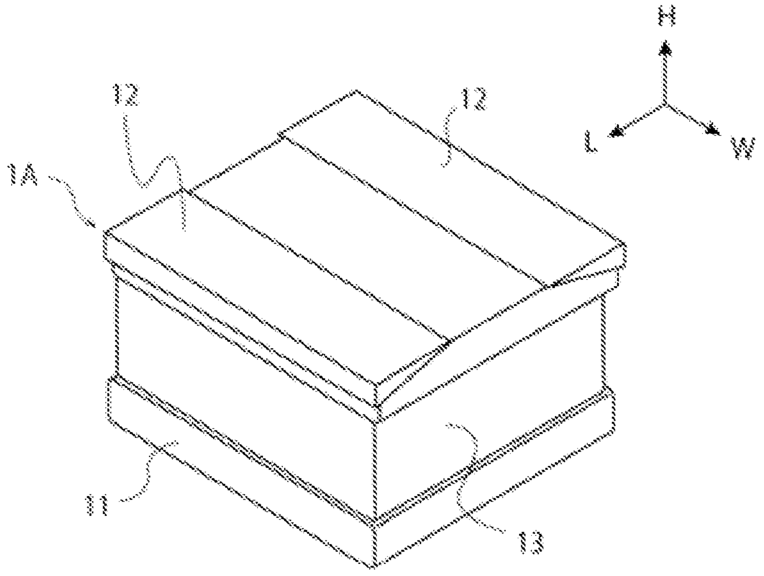
FIG. 4 is a perspective view of a coil component that has a modified structure.
Figure 5:
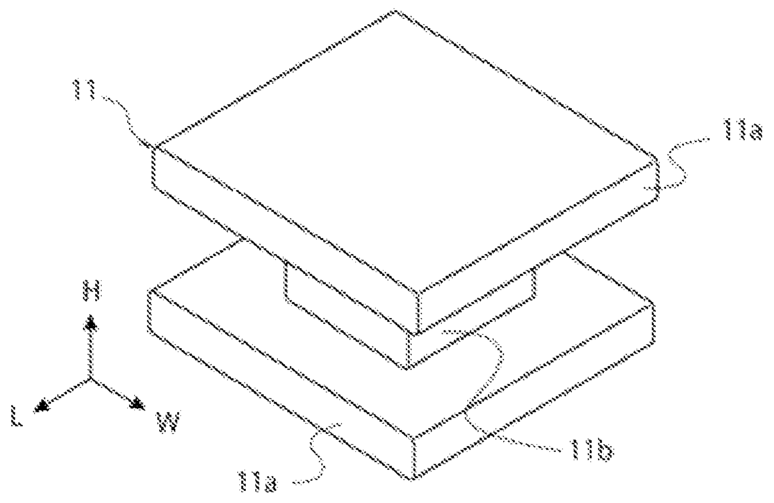
FIG. 5 is a perspective view illustrating a shape of an element body of the coil component shown in FIG. 4.

FIG. 4 is a perspective view of a coil component 1A that has a modified structure. FIG. 5 is a perspective view illustrating a shape of an element body 11 of the coil component 1A shown in FIG. 4.

The coil component 1A illustrated in FIGS. 4 and 5 includes the element body 11, outer electrodes 12, and an armoring portion 13. The coil component 1A further includes a conductor thereinside. In the coil component 1A, the element body 11 includes a core 11*b* that extends in the height direction. Two flanges 11*a* are provided at the upper and lower ends of the core 11*b*. The two outer electrodes 12 are provided on one of the flanges 11*a*.

Figure 6:
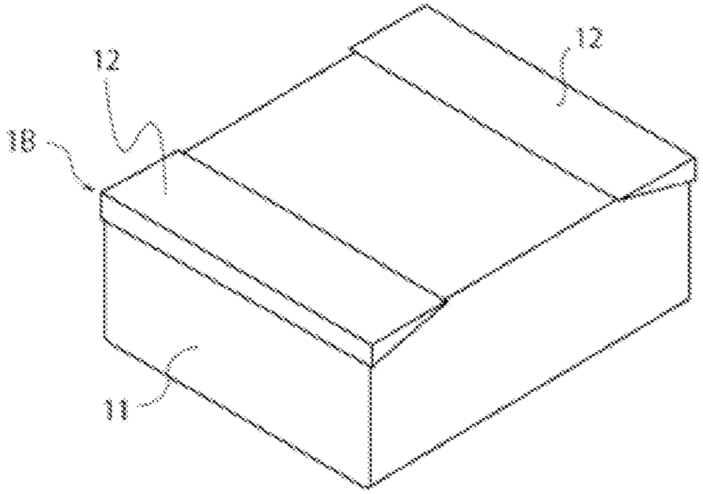
FIG. 6 is a perspective view illustrating another modification to a coil component.
Figure 7:
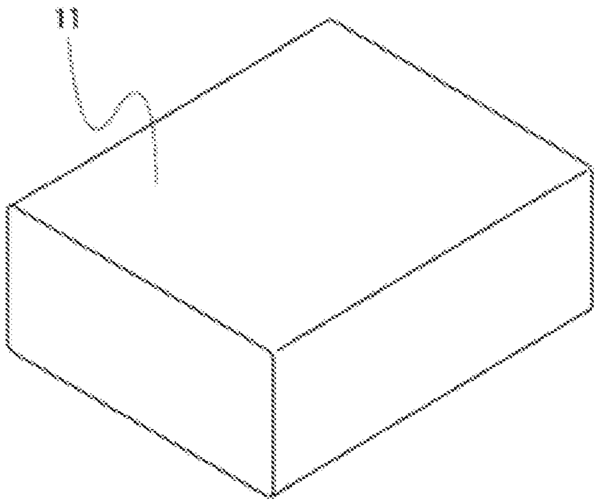
FIG. 7 is a perspective view of an element body of the coil component shown in FIG. 6.

FIG. 6 is a perspective view of a coil component 1B that has another modified configuration, and FIG. 7 is a perspective view illustrating a shape of an element body 11 of the coil component 1B.

The element body 11 of the coil component 1B is not a drum core. The element body 11 has a rectangular parallelepipedal outer shape. According to the modification example illustrated in FIGS. 6 and 7, a conductor is provided inside the element body 11. The element body 11 and the inner conductor are, for example, formed into a single unit through lamination in the coil component 1B.

In forming such a unit through lamination, a plurality of magnetic sheets made of the above-mentioned composite magnetic material are prepared, and a planar conductor pattern for forming the conductor is formed on the surface of each of the magnetic sheets, for example, by printing or the like. In forming the conductor pattern, a technique other than printing may be used. For example, plating, vapor deposition, or paste transfer may be used.

One or more lead conductors that connect the conductor patterns are also formed. The lead conductors are formed, for example, by printing or filling. The lead conductors may be printed simultaneously as the conductor patterns are printed, or the lead conductors and the conductor patterns may be printed separately from each other. In forming the lead conductors, a technique other than printing may be used. For example, plating, vapor deposition, or paste transfer may be used.

Thereafter, a plurality of magnetic sheets that have no conductor patterns and no lead conductors thereon are prepared. These magnetic sheets, which have no conductor patterns and no lead conductors thereon, and the magnetic sheets, which have the conductor patterns and the lead conductors thereon, are stacked on top of each other and compression-bonded to yield a multilayer stack. Then, the multilayer stack is cut into a plurality of individual pieces (element bodies), and the individual pieces are subjected to heat treatment. As a result, a plurality of the element bodies 11 each having the conductor embedded therein are obtained. The heat treatment to the individual pieces (element bodies) may be carried out at a temperature between 600 degrees C. and 850 degrees C. In this heat treatment, resin may be removed through thermal decomposition and the magnetic material may be sintered.

Structure of the Outer Electrode

Figure 8:
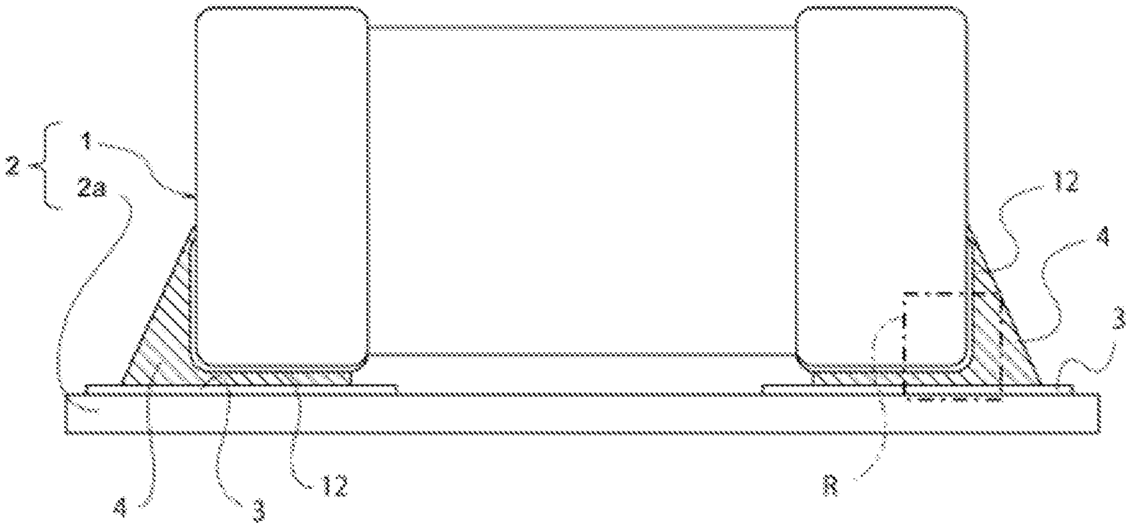
FIG. 8 illustrates a circuit board arrangement that includes a substrate and the coil component of FIG. 1 mounted on the substrate.
Figure 9:
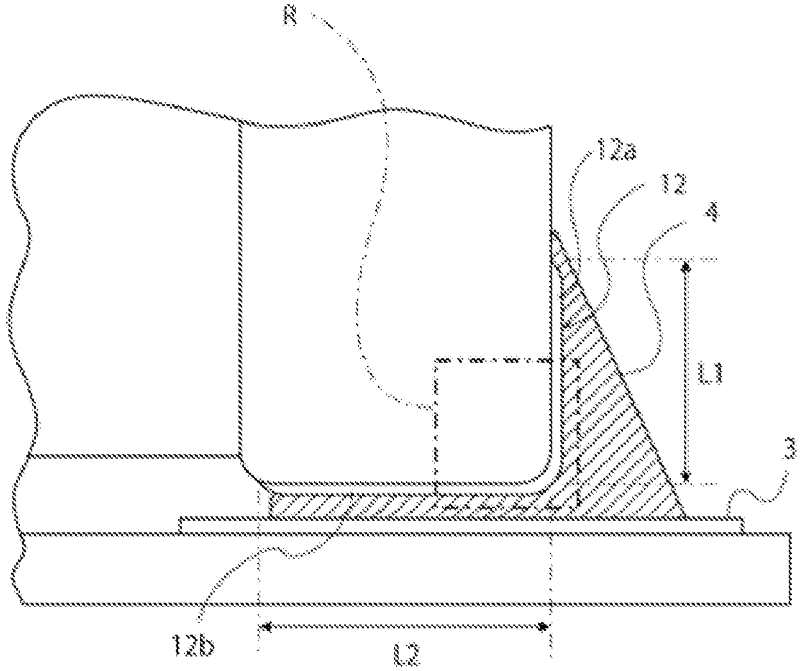
FIG. 9 is a fragmentary enlarged view of the circuit board arrangement shown in FIG. 8.

FIG. 8 illustrates a device 2, in which the coil component 1 shown in FIGS. 1 to 3 is mounted on a substrate 2*a*, and FIG. 9 is a fragmentary enlarged view of the device 2 of FIG. 8.

A combination of the coil component 1 and the substrate 2*a* may be referred to as a circuit board arrangement 2. Two land portions 3, for example, are provided on the substrate 2*a*. The coil component 1 is mounted on the substrate 2*a* as the two outer electrodes 12 are bonded to the corresponding land portions 3 on the substrate 2*a* by solder 4. The circuit board arrangement 2 can be used in a variety of electronic devices. Conceivable examples of electronic devices provided with the circuit board arrangement 2 include a smartphone, a tablet device, a game console, an electrical part in an automobile, a server, a board computer, and various other electronic devices.

Each of the outer electrodes 12 includes an end face portion 12*a* extending along the end face 1*a*/1*b* of the coil component 1, and a bottom face portion 12*b* extending along the bottom face 1*d* of the coil component 1. Each of the outer electrodes 12 extends over the two surfaces (the bottom face 1*d* and the end face 1*a*/1*b*) continuously in the extending direction from the bottom face 1*d* to the end face 1*a*/1*b*. Thus, the extending direction of the end face portion 12*a* is the height direction of the coil component 1, and the extending direction of the bottom face portion 12*b* is the length direction of the coil component 1. It should be noted that each of the outer electrodes 12 may further include a portion reaching the front face 1*e* and/or the rear face if of the coil component 1.

The inventors have investigated stresses exerted on or in each of the outer electrodes 12. As a result of the investigation, the inventors have come to an understanding that two kinds of stress have a large influence on the outer electrode 12. One of the stresses is a stress mainly caused by a plating layer (described later), which is a part of the outer electrode 12, and produced in the outer electrode 12 itself. The other stress is a stress exerted by the solder 4 when the outer electrode 12 is mounted on the substrate 2*a*.

As described above, each of the outer electrodes 12 has a layered structure.

Figure 10:
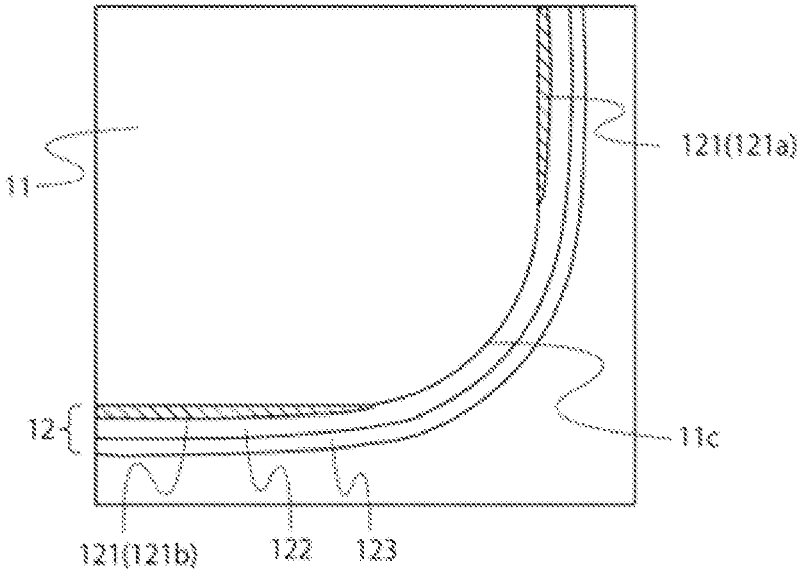
FIG. 10 illustrates a multilayer structure of an outer electrode of the coil component shown in FIG. 1.

FIG. 10 illustrates the layered structure of the outer electrode 12. FIG. 10 is an enlarged view of a region R of the circuit board arrangement 2 indicated in FIGS. 8 and 9.

Each of the outer electrodes 12 includes a base electrode layer 121, a nickel layer 122 and a tin layer 123. The base electrode layer 121 is formed on the surface of the element body 11 and made of, for example, Cu (copper) or Ag (silver). The nickel layer 122 is made of Ni (nickel) and formed, for example, by plating. The tin layer 123 is made of Sn (tin) and formed, for example, by plating. The nickel layer 122 and the tin layer 123 function as an integrated metal layer. In the following description, a combination of the nickel layer 122 and the tin layer 123 may simply be referred to as the metal layer.

The base electrode layer 121 is formed directly on the surface of the element body 11 by sputtering, application of paste containing a metal material, sintering, or the like. The nickel layer 122 and the tin layer 123 may be formed by sputtering or vapor deposition, other than by plating.

The base electrode layer 121 is divided into an end face portion 121*a* located on the end face 1*a*/1*b* and a bottom face portion 121*b* located on the bottom face 1*d*. Thus, the surface of the element body 11 includes a discontinuous region 11*c* on which no base electrode layer 121 is present. The end face portion 121*a* and the bottom face portion 121*b* are discontinuous from each other, i.e., the end face portion 121*a* and the bottom face portion 121*b* are spaced apart from each other on at least certain area (region) 11*c* of the surface of the element body 11. In FIG. 10, the discontinuous region 11*c* is present in an area that connects the end face 1*a*/1*b* to the bottom face 1*d*. In FIG. 10, the discontinuous region 11*c* extends in a direction perpendicular to the sheet of the drawing (i.e., in the width direction of the coil component 1).

The presence of the discontinuous region 11*c* can be confirmed by observing a cross section of the ridge of the element body 11 with a scanning electron microscope (SEM) or the like. For example, the observation with the SEM can reveal whether the discontinuous region 11*c* is present in a contact area between the metal layer, which is composed of the nickel layer 122 and the tin layer 123, and the element body 11, or the discontinuous region 11*c* is formed by an air gap that is produced by oxygen atoms.

The stresses produced in the outer electrode 12 includes two stresses, i.e., a stress produced in the outer electrode 12 itself, and a stress produced between the outer electrode 12 and the element body 11. The stress produced in the outer electrode 12 itself is stress produced by the difference in the property of the base electrode layer 121 and the metal layer, and the stress produced between the outer electrode 12 and the element body 11 is stress produced by the difference in the property of the element body 11 and the base electrode layer 121. The stress produced in the outer electrode 12 includes a stress produced near or on the end face 1*a*/1*b* and a stress produced near or on the bottom face 1*d*.

Since the discontinuous region 11*c* separates the end face portion 121*a* of the base electrode layer 121 from the bottom face portion 121*b* of the base electrode layer 121, the stress produced in the outer electrode 12 is divided into the stress produced at the surface of the outer electrode 12 that faces the end face 1*a*/1*b* and the stress produced at the surface of the outer electrode 12 that faces the bottom face 1*d*. Thus, the stress in the outer electrode 12 as a whole is dispersed, i.e., the concentration of the stress is alleviated in the outer electrode 12.

Because the outer electrode 12 is provided at the end face portion 121*a*, the bottom face portion 121*b*, and the area 11*c* between the end face portion 121*a* and the bottom face portion 121*b*, and no outer electrode is provided at a portion opposing the bottom face portion 121*b*, the stress generated in or exerted on the outer electrode 12 can be further suppressed. Concentration of the stress is alleviated as the number of surfaces in which stress is generated is smaller. The number of surfaces in which the stress is generated in the outer electrode 12 may be four, three, or two in this embodiment. The number of surfaces in which the stress is generated in the outer electrode 12 is four when the outer electrode 12 extends on the end face portion 121*a*, the bottom face portion 121*b*, a front face portion, and a rear face portion. The number of surfaces in which the stress is generated in the outer electrode 12 is three when the outer electrode 12 extends on the end face portion 121*a*, the bottom face portion 121*b*, and the front face portion (or the rear face portion). The number of surfaces in which the stress is generated in the outer electrode 12 is two when the outer electrode 12 extends on the end face portion 121*a* and the bottom face portion 121*b*.

Dispersion (deconcentration) of the stress, which is achieved by the presence of the discontinuous region 11*c*, works for both the stress produced in the outer electrode 12 itself and the stress produced between the outer electrode 12 and the element body 11. Since these stresses are produced on the two opposite faces (outer and inner faces) of the base electrode layer 121, transmission of the stress is interrupted by the discontinuous region 11*c* present between the end face portion 121*a* and the bottom face portion 121*b*. Thus, the stress in the outer electrode 12 as a whole is alleviated.

As illustrated in FIG. 9, the length L1 of the end face portion 12*a* is smaller than the length L2 of the bottom face portion 12*b* in the extending direction of the outer electrode 12 from the bottom face 1*d* to the end face 1*a*/1*b*. With this configuration, concentration of the stress exerted on the outer electrode 12 on the end face 1*a*/1*b* is alleviated.

In particular, the stress exerted from the solder 4 when the outer electrode 12 is mounted on the substrate 2*a* is greater in the direction of the end face 1*a*/1*b*, and the stress exerted by deflection of the substrate 2*a* acts substantially only in the direction of the end face 1*a*/1*b*. Therefore, if the discontinuous region 11*c* is provided at a portion other than the portion between the end face portion 121*a* and the bottom face portion 121*b*, the effect of alleviating concentration of stress exerted in the direction of the end face 1*a*/1*b* is not obtained.

The metal packing fraction (percentage) of the metal layer, which is composed of the nickel layer 122 and the tin layer 123, is from 97 to 99 [vol %] if the metal layer is formed by plating or from 97 to 99.5 [vol %] if the metal layer is formed by sputtering. In contrast, the metal packing fraction of the base electrode layer 121 is from 78 to 95 [vol %]. Accordingly, the metal packing fraction of the metal layer is higher than the metal packing fraction of the base electrode layer 121.

The metal packing fraction is a value obtained by observing a cross section enlarged by a factor of 50,000 by an SEM, obtaining the area of a metal portion and the area of a portion other than the metal portion present in the cross section through image processing, and calculating the percentage of the area of the metal portion relative to the total area of the cross section. Examples of the portion other than the metal portion include an air gap, a resin component, or any impurity mixed in the metal layer.

Because the coil component 1 has the above-described outer electrodes 12, concentration of the stress in the outer electrodes 12 can be alleviated, and the metal packing fraction of the metal layer (112, 123) can be increased. Hence, the metal layer having a metal packing fraction higher than the metal packing fraction of the base electrode layer 121 covers the base electrode layer 121, i.e., the base electrode layer 121 is covered with the metal layer with fewer voids, and thus the reliability of mounting the coil component 1 on the board 2*a* improves. Moreover, the deterioration of the outer electrodes 12 over time can be suppressed. Furthermore, the presence of the nickel layers 122 can suppress deterioration of the outer electrodes 12 as a whole.

In a configuration in which each of the outer electrodes 12 is formed of the base electrode layer 121 and the two plating layers 122 and 123, the nickel plating layer 122 may be a thick layer, i.e., the nickel layer 122 is thicker than the tin layer 123. As such a thick nickel layer 122 is provided, deterioration over time is further suppressed, and the resistance value of the outer electrode 12 is reduced. Thus, performance of the coil component 1 improves.

In a configuration in which the outer electrode 12 is formed of the base electrode layer 121 and the two layers 122 and 123 made by sputtering, the nickel layer 122 may be a thin layer since the metal packing fraction of the nickel layer 122 is high. It should be noted that the outer electrode 12 may be formed of the base electrode layer 121 and a combination of the nickel layer 122 that is a sputtering layer and the tin layer 123 that is a plating layer. The outer electrode 12 that includes the nickel layer 122 (i.e., the sputtering layer having a high metal packing fraction) can be thinner as a whole. For example, the nickel layer 122 is thinner than the tin layer 123.

Now, some other embodiments in which outer electrodes 12 have different multilayer structures will be described. Duplicate description concerning features other than the multilayer structure will be omitted.

Second Embodiment

Figure 11:
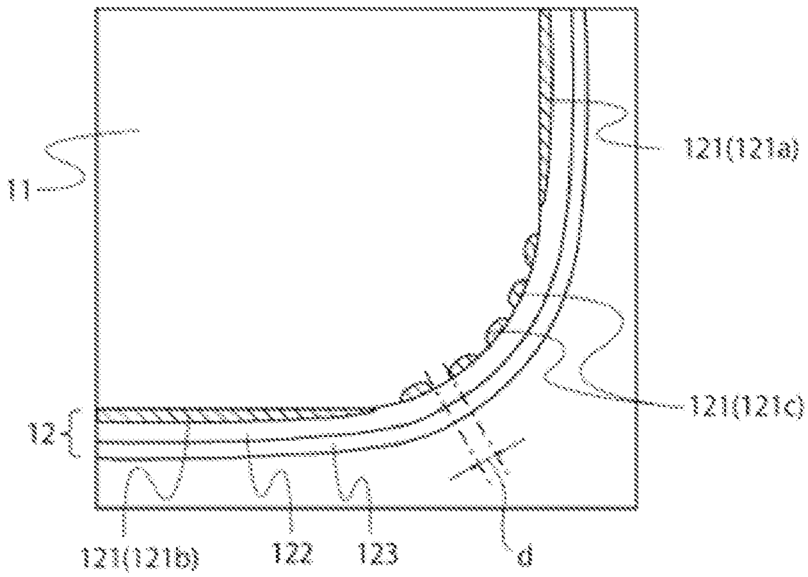
FIG. 11 illustrates a multilayer structure of an outer electrode according to a second embodiment of the invention.

FIG. 11 illustrates a multilayer structure of an outer electrode 12 according to a second embodiment of the invention.

In the outer electrode 12 of the second embodiment, a plurality of dot portions 121*c*, serving as a part of a base electrode layer 121, are provided between an end face portion 121*a* and a bottom face portion 121*b* of the base electrode layer 121. The dot portions 121*c* are discontinuous from the end face portion 121*a* and the bottom face portion 121*b*. The dot portions 121*c* are provided, for example, in recess portions where the surface of the element body 11 is recessed inward.

The presence of the dot portions 121*c* improves and enhances the connection (joining) between the element body 11 and a metal layer (combination of a nickel layer 122 and a tin layer 123). Therefore, the distance between the end face portion 121*a* and the bottom face portion 121*b* of the base electrode layer 121 can be increased, and the stress can be further alleviated. The presence of the dot portions 121*c* can be confirmed through an analysis by an SEM or the like.

Preferably, a gap d between adjacent dot portions 121*c* is no more than five times the total thickness of the nickel layer 122 and the tin layer 123. When the gap d is within this upper limit, the nickel layer 122 and the tin layer 123 can be formed continuously from the end face portion 121*a* to the bottom face portion 121*b* by plating.

More preferably, the gap d between adjacent dot portions 121*c* is no more than twice the total thickness of the nickel layer 122 and the tin layer 123. When the gap d is within this upper limit, the thickness of the nickel layer 122 and the thickness of the tin layer 123 become commensurate in the portion between the end face portion 121*a* and the bottom face portion 121*b*. As a result, the total thickness of the nickel layer 122 and the tin layer 123 can be reduced. This reduced thickness in the portion between the end face portion 121*a* and the bottom face portion 121*b* enhances the effect of the above-described stress dispersion, and stress in the outer electrode 12 as a whole can be alleviated even further.

Third Embodiment

Figure 12:
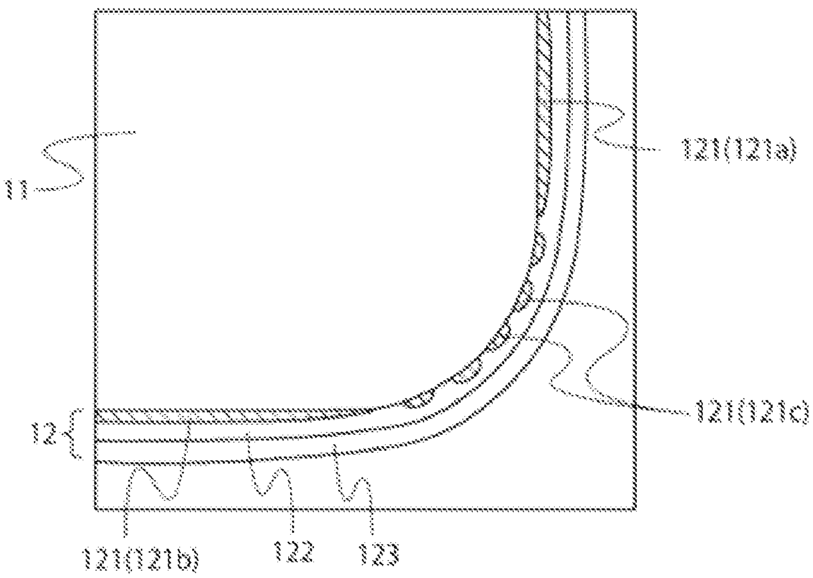
FIG. 12 illustrates a multilayer structure of an outer electrode according to a third embodiment of the invention.

FIG. 12 illustrates a multilayer structure of an outer electrode 12 according to a third embodiment of the invention.

The outer electrode 12 of the third embodiment also includes dot portions 121*c* in a base electrode layer 121. According to the third embodiment, the surface of the element body 11 has no recess portion. The dot portions 121*c* are provided such that the dot portions 121*c* project from the surface of the element body 11.

Even when the dot portions 121*c* project from the surface of the element body 11, the connection (joining) between the element body 11 and the metal layer (combination of a nickel layer 122 and a tin layer 123) can be improved. Similar to the second embodiment, therefore, the configuration of the third embodiment can increase the distance between an end face portion 121*a* and a bottom face portion 121*b* of the base electrode layer 121, and further alleviate the stress in the outer electrode 12.

Fourth Embodiment

Figure 13:
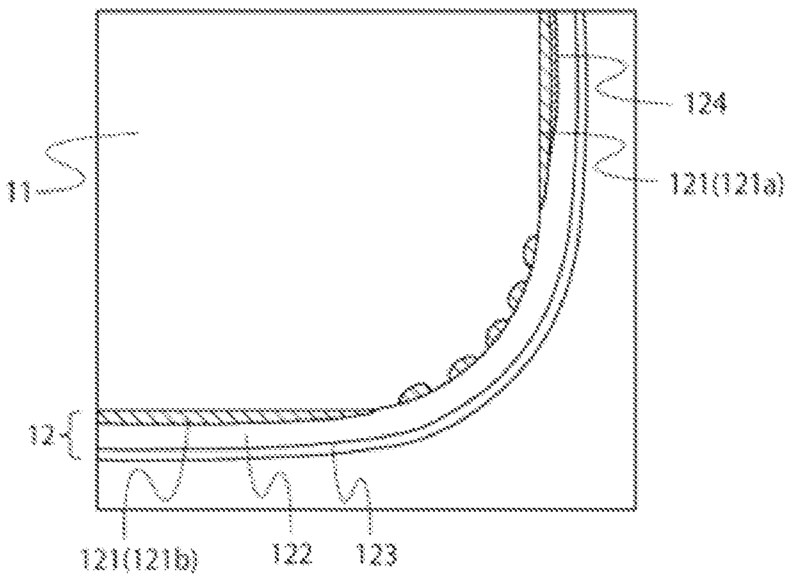
FIG. 13 illustrates a multilayer structure of an outer electrode according to a fourth embodiment of the invention.

FIG. 13 illustrates a multilayer structure of an outer electrode 12 according to a fourth embodiment of the invention.

The outer electrode 12 of the fourth embodiment includes a conductive resin layer 124 provided between a base electrode layer 121 and a metal layer (combination of a nickel layer 122 and a tin layer 123). The conductive resin layer 124 may be provided on a part of the base electrode layer 121. In the configuration illustrated in FIG. 13, the conductive resin layer 124 is provided on an end face portion 121*a* of the base electrode layer 121.

The metal packing fraction of the conductive resin layer 124 is from 30 to 60 [vol %], and the conductive resin layer 124 has a metal packing fraction further lower than the metal packing fraction of the base electrode layer 121. Therefore, stress produced between the metal layer (combination of the nickel layer 122 and the tin layer 123) and the base electrode layer 121 is further alleviated. In particular, when the conductive resin layer 124 is provided on the end face portion 121*a*, stress is alleviated at the area where the conductive resin layer 124 is present, and in other areas where no conductive resin layer 124 is present, different effects (e.g., improvement in the mechanical strength of the outer electrode 12 and reduction of the thickness in these areas) can be obtained. Although not illustrated, similar effects can be obtained if the conductive resin layer 124 is provided over the end face portion 121*a* and a discontinuous region 11*c*, or if the conductive resin layer 124 is provided on a bottom face portion 121*b*.

Manufacturing Method

Figure 14A:
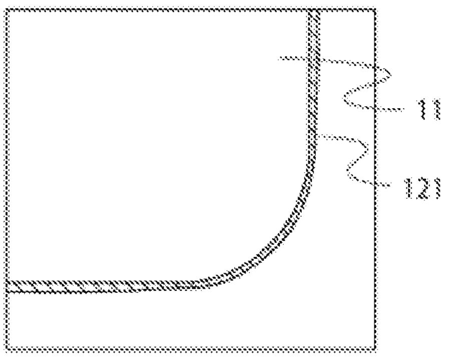
FIGS. 14A to 14C illustrate, in combination, a method of forming the multilayer structure of the outer electrode shown in FIG. 10.
Figure 14B:
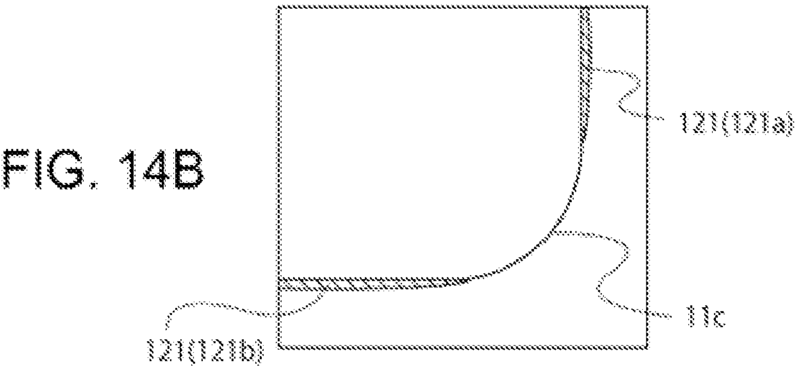
Figure 14C:
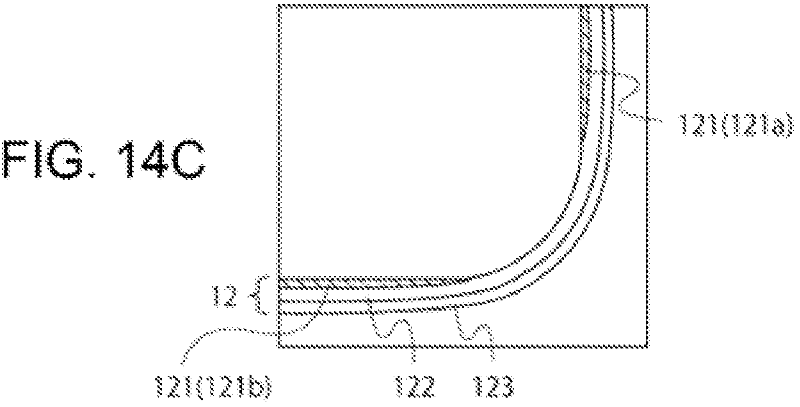
Figure 15A:
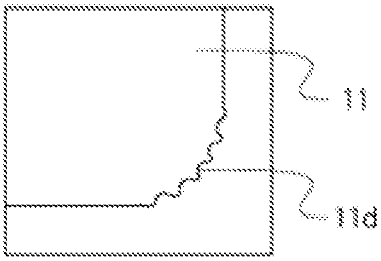
FIGS. 15A to 15D illustrate, in combination, another method of forming the multilayer structure of the outer electrode shown in FIG. 11.
Figure 15B:
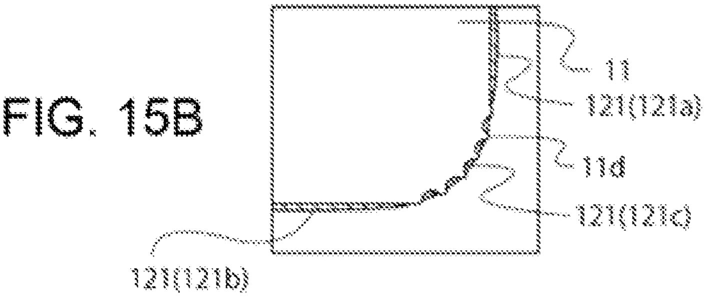
Figure 15C:
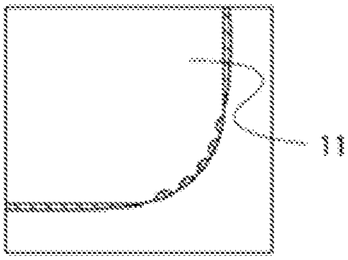
Figure 15D:
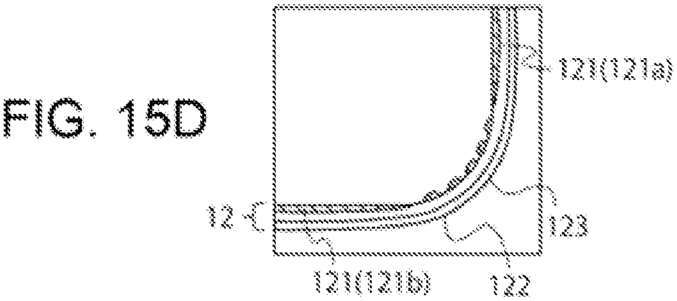

FIGS. 14A to 14C illustrate a method of forming the multilayer structure of the outer electrode 12.

The forming method illustrated in FIGS. 14A to 14C can manufacture the multilayer structure of the outer electrode 12 illustrated in FIG. 10.

The forming method illustrated in FIGS. 14A to 14C has three steps. At a first step of the forming method (FIG. 14A), the base electrode layer 121 continuous from the bottom face to the end face is formed on the surface of the element body 11.

At a second step of the forming method (FIG. 14B), the ridges of the element body 11 are subjected to surface treatment (e.g., blasting or the like), and the base electrode layer 121 is separated into the end face portion 121*a* and the bottom face portion 121*b*. The discontinuous region 11*c* in which the element body 11 is exposed is formed between the end face portion 121*a* and the bottom face portion 121*b*.

At a third step of the forming method (FIG. 14C), a nickel layer 122 and a tin layer 123 each continuous from the base face to the end face are formed, and the multilayer structure of the outer electrode 12 is formed.

FIGS. 15A to 15D illustrate another method of forming the multilayer structure of the outer electrode 12.

The forming method illustrated in FIGS. 15A to 15D can manufacture the multilayer structure of the outer electrode 12 illustrated in FIG. 11.

The forming method illustrated in FIGS. 15A to 15D has four steps. At a first step of the forming method (FIG. 15A), the element body 11 having a rugged shape (i.e., a plurality of recesses and projections) 11*d* at its edges is prepared.

At a second step of the forming method (FIG. 15B), a material for the base electrode layer 121 is applied to the surface of the element body 11. Because of the rugged shape (concave-convex shape) 11*d* at each of the ridges, the base electrode layer 121 naturally becomes discontinuous at the ridge. Thus, the end face portion 121*a* and the bottom face portion 121*b* are formed, and the dot portions 121*c* are formed in the recess portions of the rugged shape 11*d*.

At a third step of the forming method (FIG. 15C), the ridge may be subjected to surface treatment. The surface treatment scrapes the projection portions of the rugged shape 11*d* but retain the recess portions. Thus, in the base electrode layer 121, the end face portion 121*a*, the bottom face portion 121*b*, and the dot portions 121*c* become discontinuous.

At a fourth step of the forming method (FIG. 15D), the nickel layer 122 and the tin layer 123 each continuous from the base face to the end face are formed. Thus, the multilayer structure of the outer electrode 12 is formed.

Figure 16A:
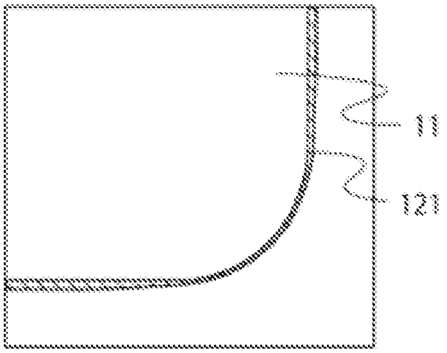
FIGS. 16A to 16C illustrate, in combination, still another method of forming the multilayer structure of the outer electrode shown in FIG. 12.
Figure 16B:
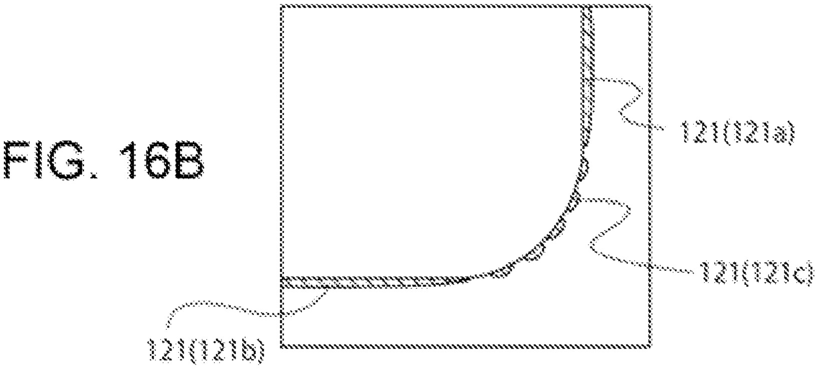
Figure 16C:
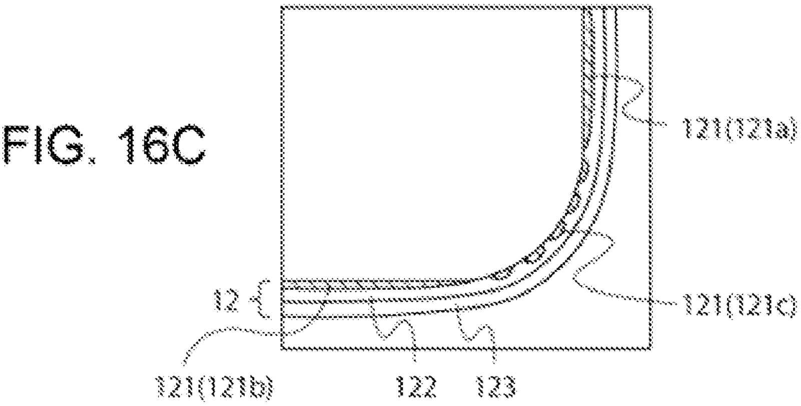

FIGS. 16A to 16C illustrate still another method of forming the multilayer structure of the outer electrode 12.

The forming method illustrated in FIGS. 16A to 16C can manufacture the multilayer structure of the outer electrode 12 illustrated in FIG. 12.

The forming method illustrated in FIGS. 16A to 16C has three steps. At a first step of the forming method (FIG. 16A), a material for the base electrode layer 121 is applied on the surface of the element body 11 to cover from its bottom face to its end face. The material for the base electrode layer 121 applied at the each of the ridges of the element body 11 is thin.

At a second step of the forming method (FIG. 16B), the material for the base electrode layer 121 is sintered, and a portion of the material for the base electrode layer 121 disappears at each of the ridges of the element body 11. Thus, the end face portion 121*a* and the bottom face portion 121*b* that are discontinuous from each other are formed, and the dot portions 121*c* that are discontinuous from the end face portion 121*a* and the bottom face portion 121*b* are formed at each of the ridges.

At a third step of the forming method (FIG. 16C), the nickel layer 122 and the tin layer 123 each continuous from the base face to the end face are formed. Thus, the multilayer structure of the outer electrode 12 is formed.

It should be noted that the above-described three forming methods of forming the multilayer structure of the outer electrode 12 may be combined or used together.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed:

1. A coil component comprising:

an element body having a first face and a second face, the first face being adjacent or continuous to the second face, and a ridge region connecting the first face and the second face;

a conductor provided inside and/or on a surface of the element body; and an outer electrode electrically connected to the conductor, the outer electrode including:

a first base electrode layer formed on the first face of the element body, a second base electrode layer formed on the second face of the element body and at least partly spaced apart from the first base electrode layer, a plurality of third base electrode layers provided on the ridge region of the element body between the first base electrode layer and the second base electrode layer, wherein the plurality of third base electrode layers are at least partly spaced apart from the first base electrode layer and the second base electrode layer, and a metal layer that continuously covers the first base electrode layer and the second base electrode layer.

2. The coil component according to claim 1, wherein the second face is a bottom face that opposes a substrate when the coil component is mounted on the substrate, the first face is an end face, and a length of the metal layer in its extending direction from the bottom face to the end face is shorter on the end face than on the bottom face.

3. The coil component according to claim 1, wherein the metal layer has a higher metal packing fraction than the first, second, and third base electrode layers.

4. The coil component according to claim 1, wherein the metal layer includes a nickel layer continuously covering the first and second base electrode layers, and a tin layer covering the nickel layer, and the tin layer is thinner than the nickel layer.

5. The coil component according to claim 1, wherein the outer electrode includes a conductive resin layer provided between the metal layer and at least one of the first base electrode layer and the second base electrode layer.

6. A circuit board arrangement comprising:

a coil component set forth in claim 1; and a substrate on which the coil component is mounted by solder bonding, the solder bonding extending over an end face of the outer electrode.

7. An electronic device comprising the circuit board arrangement set forth in claim 6.

8. A method of manufacturing the coil component set forth in claim 1, the method comprising:

forming a rugged shape at a portion bordering the first face and the second face of the element body;

applying a material for a base electrode layer over the first face and the second face of the element body in which the rugged shape has been formed; and simultaneously as or after the applying of the material, forming the first base electrode layer and the second base electrode layer that are at least partly spaced apart from each other.

9. A method of manufacturing the coil component set forth in claim 1, the method comprising:

applying a material for a base electrode layer over the first face and the second face of the element body; and forming the first base electrode layer and the second base electrode layer that are at least partly spaced apart from each other, by reducing the material applied at a portion bordering the first face and the second face.

10. The coil component according to claim 1, wherein the ridge region is a rounded edge, and the plurality of third base electrode layers are provided on the rounded edge.

11. The coil component according to claim 1, wherein a gap between adjacent third base electrode layers is no more than five times a thickness of the metal layer.

12. The coil component according to claim 1, wherein a gap between adjacent third base electrode layers is no more than twice a thickness of the metal layer.

13. The coil component according to claim 1, wherein the ridge region has recess portions recessed inward, and the plurality of third base electrode layers are provided in the recess portions.

* * * * *